United States Patent [19]
Kouba

[11] Patent Number: 4,950,973
[45] Date of Patent: Aug. 21, 1990

[54] PERMANENT MAGNET GENERATOR SYSTEM

[75] Inventor: Carroll C. Kouba, Fort Shawnee, Ohio

[73] Assignee: Westinghouse Electric Corp., Pittsburgh, Pa.

[21] Appl. No.: 373,716

[22] Filed: Jun. 29, 1989

[51] Int. Cl.$^5$ ............................................. H02P 9/10
[52] U.S. Cl. ...................................... 322/69; 322/59; 361/20; 361/21
[58] Field of Search .................. 322/8, 59, 60, 69, 70, 322/91, 94; 361/20, 21, 23, 24, 31, 32; 307/85

[56] References Cited

U.S. PATENT DOCUMENTS

| | | | |
|---|---|---|---|
| 2,426,005 | 8/1947 | Exner | 322/69 X |
| 3,210,603 | 10/1965 | Calfee et al. | 361/20 |
| 3,656,136 | 4/1972 | Blair | 361/31 X |
| 3,903,456 | 9/1975 | Schaefer | 361/24 |
| 3,908,161 | 9/1975 | Messenger | 322/59 X |
| 4,207,602 | 6/1980 | Kussy et al. | 361/32 X |
| 4,322,630 | 3/1982 | Mezera et al. | 307/87 X |
| 4,486,801 | 12/1984 | Jackovich et al. | 361/21 |
| 4,641,080 | 2/1987 | Glennon et al. | 322/49 |
| 4,710,840 | 12/1987 | Shepler et al. | 361/20 |

FOREIGN PATENT DOCUMENTS

| | | | |
|---|---|---|---|
| 0055896 | 4/1985 | Japan | 322/8 |
| 0756536 | 8/1980 | U.S.S.R. | 361/21 |

Primary Examiner—Peter S. Wong
Assistant Examiner—Kristine Peckman
Attorney, Agent, or Firm—R. P. Lenart

[57] ABSTRACT

A permanent magnet generator system is provided with a permanent magnet generator having a multiple phase armature that includes several circuit branches which are electrically connected to provide a multiple phase output voltage to the output terminals of the generator. At least two of the circuit branches include an armature phase winding and a switching device electrically connected in series with the winding. The switching devices are opened and closed in response to a control signal to disconnect the generator from the remainder of the electrical system and to simultaneously de-energize the individual phase windings of the generator armature to protect against a fault occurring within the generator housing.

6 Claims, 1 Drawing Sheet

PERMANENT MAGNET GENERATOR SYSTEM

BACKGROUND OF THE INVENTION

This invention relates to permanent magnet electrical generator systems and, more particularly, to techniques for connecting and disconnecting permanent magnet generators to electrical systems.

Permanent magnet generators are utilized in a variety of electrical generating systems. Since the field of a permanent magnet generator cannot be de-energized, output voltage is produced when the rotor of the generator is driven by an external power source. Faults, such as short circuits in electrical cables and components external to the generator output terminals, will therefore continue to draw current until the generator stops or the circuit is otherwise disconnected. Mechanical disconnects are used to disconnect a permanent magnet generator rotor shaft from the drive source in certain applications. However, for aircraft applications the weight, expense and design problems presented by high speed operation make mechanical disconnects undesirable. Fuses and circuit breakers can be utilized but they are also undesirable for aircraft applications because they must be manually reset. It is therefore desirable to devise a technique for connecting and disconnecting a permanent magnet generator from an electrical system under both normal operating and fault conditions that can be performed in a relatively light weight system and without manual intervention.

SUMMARY OF THE INVENTION

This invention provides a permanent magnet generator system with the capability of connecting or disconnecting the output of a polyphase permanent magnet generator from the remainder of an electrical system under both normal and fault conditions. A permanent magnet generator system constructed in accordance with this invention includes a permanent magnet generator having a multiple phase armature including a plurality of circuit branches. The circuit branches are electrically connected to provide a multiple phase output voltage to the generator output terminals. At least two of the circuit branches include an armature phase winding and a switching device electrically connected in series with each other. The switching device is opened or closed in response to a control signal.

By locating the switching devices in series with each of the phase windings and mounting them inside or very near to the permanent magnet generator housing, the switching function can be performed by a contactor which provides two necessary system connect/disconnect functions utilizing a single component where two components would otherwise be required, thereby saving electrical system weight and cost, while improving system reliability.

BRIEF DESCRIPTION OF THE DRAWINGS

The invention will become more readily apparent from the following description of the preferred embodiments thereof, shown by way of example only, in the accompanying drawings, wherein.

DESCRIPTION OF THE PREFERRED EMBODIMENTS

Figure 1:
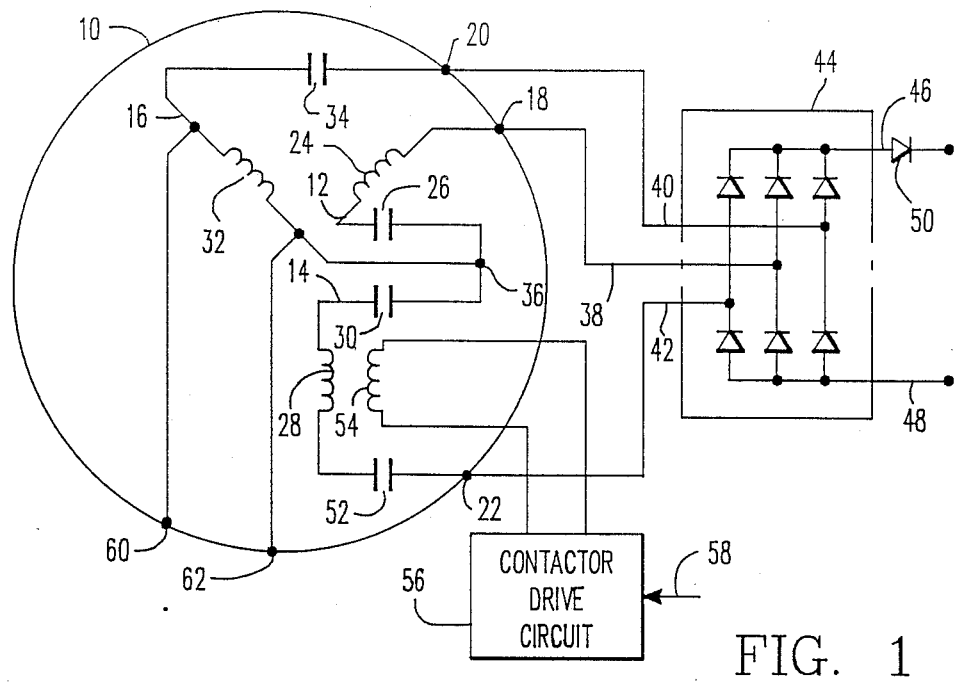
FIG. 1 is a schematic diagram of one embodiment of the present invention.

Referring to the drawings, FIG. 1 is a schematic diagram of one embodiment of the present invention. A permanent magnet generator 10 is constructed in accordance with known techniques to include a rotor, not shown, mounted for relative rotation with a stator and adapted to be driven by an external prime mover. The stator includes a multiple phase armature winding having circuit branches 12, 14 and 16 which are connected in a WYE configuration to output terminals 18, 20 and 22. Circuit branch 12 includes the series connection of a first armature winding 24 and a first pair of contacts 26. Circuit branch 14 includes the series connection of a second armature phase winding 28 and a second pair of contacts 30. Circuit branch 16 includes the series connection of a third armature phase winding 32 and a third pair of contacts 34. Each of the circuit branches is electrically connected between one of the output terminals and a neutral point 36.

In operation, the generator provides an AC output voltage on conductors 38, 40 and 42. This voltage is rectified by a diode bridge 44 to produce a DC output on power bus conductors 46 and 48. A protective diode 50 is provided in series with power bus 46. An additional contact pair 52 is provided in series with phase winding 28 in circuit branch 14. All of the contact pairs are closed or opened by energizing or de-energizing contactor coil 54. This function is performed by a contactor drive circuit 56, constructed in accordance with well known techniques, that responds to an input control signal on line 58. This control signal may be, for example, a turn on signal applied by manually actuating a switch, or a protection signal which may be produced in response to the sensing of a fault in the electrical system. When the contacts are open, all of the permanent magnet generator armature windings are opened such that the voltage is removed from the system and the system is protected. With contact pairs 26 and 30 provided in the neutral leads of the multiple phase output winding as shown in FIG. 1, the individual phase windings are also de-energized to provide protection against a phase-to-phase fault which might occur within the permanent magnet generator. In an alternative embodiment, contact pairs 34 and 52 can be eliminated. However, in that embodiment, the possibility exists that a phase-to-phase short within the permanent magnet generator can allow fault current to flow to a load at reduced voltage with contact pairs 26 and 30 open. The addition of contacts pairs 34 and 52 guards against this possibility. By providing a contactor inside or very near the multiple phase permanent magnet generator source, with contacts connected as shown in FIG. 1, the contactor is made to provide two necessary system connect/disconnect functions utilizing only one system component where two would otherwise be required, thereby saving electrical system weight and cost, while improving system reliability. By utilizing the contactor as shown in the AC sections of the circuit instead of on the DC power bus, the current to be interrupted is reduced to approximately 80% of that existing on the DC side of the rectifier 44 thereby saving contact size, weight and cost. It is well known that DC current is difficult to interrupt because the current does not go to zero as does AC current. Contact arcing can be severe, causing shortened contact life.

The generator of FIG. 1 includes a pair of additional output terminals 60 and 62 that are connected across phase winding 32 to provide low signal or control power which is energized even when the contact pairs are opened, in the event that such control power is required by the particular system application.

Figure 2:
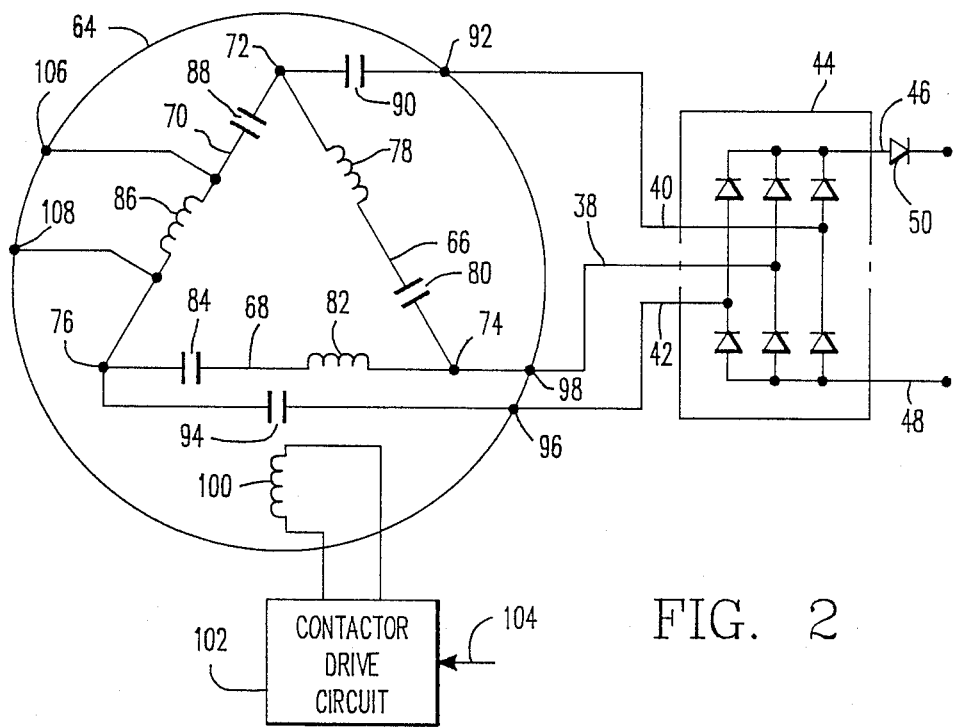
FIG. 2 is a schematic diagram of an alternative embodiment of the present invention.

For permanent magnet generator armature windings connected in a delta configuration, an additional contactor pole is required. Such a system is illustrated in FIG. 2. A generator 64 is provided with a three phase armature winding having circuit branches 66, 68 and 70 electrically connected between connection points 72, 74 and 76 as shown. Circuit branch 66 includes the series connection of a first phase winding 78 and a first pair of contacts 80. Circuit branch 68 includes the series connection of a second phase winding 82 and a second pair of contacts 84. Circuit branch 70 includes the series connection of a third phase winding 86 and a third pair of contacts 88. A fourth pair of contacts 90 is electrically connected between connection point 72 and a first output terminal 92. Another pair of contacts 94 is electrically connected between connection point 76 and a second output terminal 96. Contacts 90 and 94 provide protection in the event of a phase-to-phase short and may be eliminated in some applications of the invention. Connection point 74 is connected to a third output terminal 98. All of the contact pairs close when contactor coil 100 is energized and open when the contactor coil is de-energized. This function is performed by a contactor drive circuit 102 in accordance with an input control signal on line 104 in the same manner as described for FIG. 1. Also, as in FIG. 1, additional output terminals 106 and 108 are connected across one of the armature phase windings 86 to provide low power control power even when the permanent magnet generator is disconnected from the rest of the power circuit.

For those cases where DC power can be fed back into the system from an external source, the diodes of the rectifier assembly 44 act to block the flow of DC power into the AC portion of the system. To provide redundancy or to protect against a fault in the rectifier assembly, an additional blocking diode 50 is inserted in DC bus 46. In an alternative design, this diode could be replaced by a DC contactor which need only be sized for normal load currents instead of large fault currents.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed is:

1. A permanent magnet generator connect/disconnect system comprising:
   a permanent magnet generator having first, second and third output terminals;
   a first circuit branch electrically connected between said first output terminal and a neutral point;
   said first circuit branch including a series connection of a first armature winding a first pair of electrical contacts, said first pair of electrical contacts being connected to said neutral point;
   a second circuit branch electrically connected between said second output terminal and said neutral point;
   said second circuit branch including a series connection of a second armature winding and a second pair of electrical contacts, said second pair of electrical contacts being connected to said neutral point;
   a third circuit branch electrically connected between said third output terminal and said neutral point;
   said third circuit branch including a third armature winding; and
   means for opening and closing said first and second pairs of electrical contacts in response to a control signal.

2. A permanent magnet generator connect/disconnect system as recited in claim 1, further comprising:
   a third pair of electrical contacts electrically connected in series with said third armature winding in said third circuit branch, said third pair of electrical contacts being connected to said third output terminal; and
   a fourth pair of electrical contacts electrically connected in series with said second armature winding in said second circuit branch, said fourth pair of electrical contacts being connected to said second output terminal;
   wherein said means for opening and closing said first and second pairs of electrical contacts also opens and closes said third and fourth pairs of electrical contacts in response to said control signal.

3. A permanent magnet generator connect/disconnect system as recited in claim 1, further comprising:
   fourth and fifth output terminals electrically connected to opposite ends of said third armature winding.

4. A permanent magnet generator connect/disconnect system comprising:
   a permanent magnet generator having first, second and third winding connection points;
   a first circuit branch electrically connected between said first and second connection points;
   said first circuit branch including a series connection of a first armature winding and a first pair of electrical contacts, said first pair of electrical contacts being connected to said second connection point;
   a second circuit branch electrically connected between said second and third connection points;
   said second circuit branch including a series connection of a second armature winding and a second pair of electrical contacts, said second pair of electrical contacts being connected to said third connection point;
   a third circuit branch electrically connected between said first and third connection points;
   said third circuit branch including a series connection of a third armature winding and a third pair of electrical contacts, said third pair of electrical contacts being connected to said first connection point; and
   means for opening and closing said first, second and third pairs of electrical contacts in response to a control signal.

5. A permanent magnet generator connect/disconnect system as recited in claim 4, further comprising:
   a fourth pair of electrical contacts electrically connected between said first connection point and a first output terminal;
   a fifth pair of electrical contacts electrically connected between said third connection point and a second output terminal;
   wherein said second connection point is connected to a third output terminal; and wherein said means for opening and closing said first, second and third pairs of electrical contacts also opens and closes said fourth and fifth pairs of electrical contacts in response to said control signal.

6. A permanent magnet generator connect/disconnect system as recited in claim 1, further comprising:
fourth and fifth output terminals electrically connected to opposite ends of said third armature winding.

* * * * *